United States Patent [19]

Lühmann

[11] Patent Number: 5,626,931

[45] Date of Patent: May 6, 1997

[54] ADHESIVE FILM STRIP

[75] Inventor: Bernd Lühmann, Norderstedt, Germany

[73] Assignee: Beiersdorf Aktiengesellschaft, Hamburg, Germany

[21] Appl. No.: 508,288

[22] Filed: Jul. 27, 1995

[30] Foreign Application Priority Data

Aug. 12, 1994 [DE] Germany .................. 44 28 587.6

[51] Int. Cl.⁶ ........................................ C09J 7/02
[52] U.S. Cl. ................ 428/40.1; 206/411; 428/41.7; 428/41.8; 428/42.1; 428/192; 428/194; 428/201; 428/202; 428/212; 428/214; 428/343; 428/354
[58] Field of Search .................. 428/40, 41, 42, 428/192, 194, 201, 202, 212, 214, 354, 343; 206/411

[56] References Cited

U.S. PATENT DOCUMENTS

| | | | |
|---|---|---|---|
| 3,583,358 | 6/1971 | Hanson | 428/194 |
| 4,024,312 | 5/1977 | Korpman | 428/343 |

FOREIGN PATENT DOCUMENTS 11333  7/1992  WIPO.

*Primary Examiner*—Nasser Ahmad
*Attorney, Agent, or Firm*—Sprung Horn Kramer & Woods

[57] ABSTRACT

Adhesive film strip for an adhesive bond which can be separated again by pulling on the strip in the direction of the bond plane, character in that the bond area decreases at one end of the adhesive film strip, while the other end serves as tab for pulling.

6 Claims, No Drawings

ADHESIVE FILM STRIP

BACKGROUND OF THE INVENTION

1. Field of the Invention

The invention relates to an adhesive film strip for temporary bonds, where the bond is separated pulling on the strip in the direction of the bond plane.

2. Description of the Related Art

Adhesive film strips of this type are known. For example, DE 3 331 016 A1 and DE 4 222 849 C1 describe elastic adhesive films for temporary adhesive bonds which allow a bond produced therewith to be separated without leaving a residue by simply pulling the adhesive film out of the adhesive join parallel to the bond plane. A specific application of these adhesive films is described in DE 3 714 453 C1. WO 92/11333 describes, inter alia, adhesive films for corresponding applications, where the adhesive films employed have low elasticity at the same time as high extensibility, and U.S. Pat. No. 4,024,312 likewise discloses an adhesive film of this type which, in similar manner to WO 92/11333, has a base film which is coated on both sides with self-adhesive composition and which is highly extensible, but nevertheless fairly resistant to tearing.

However, the adhesive systems described in the, above-mentioned patents also have a number of disadvantages:

If one of the bond partners comprises a very sensitive material, at least partial damage to this material can occur at the end of the separation process.

Again at the end of the separation process, partial tearing of the adhesive tape at its end can occur, resulting in adhesive residues remaining on at least one of the bond partners, i.e. the bond cannot be separated in a totally residue-free manner, in the worst case a bond remains between the bond partners and the bond partners must be separated in such a way that one or even both are damaged.

These disadvantages are of considerable importance for practical use, and in particular a user who finds that his bond that he thought to be reversible thus becomes irreversible due to tearing toward the end of the separation process is probably lost as a customer forever.

The object of the invention was to overcome these disadvantages, in particular in the case of product types consisting of adhesive composition, while the highly tear-resistant film base in other product types affords somewhat greater insurance against tears, although the problems mentioned also occur therein.

SUMMARY OF THE INVENTION

Accordingly, the invention relates to adhesive film strips as characterized in greater detail in the patent claims.

The ends of the novel adhesive film strips are thus shaped in a particular way in order that the bond area decreases toward the end of the adhesive film strip which disappears in the adhesive join, while the other end can then be pulled.

DESCRIPTION OF THE PREFERRED EMBODIMENTS

Examples of highly suitable shapes are pointed, serrated and convex-curved strip ends, or alternatively strips having a wavy end border, to mention but a few possibilities. The essential feature in each case is a reduction in the bond area toward the end of the adhesive strip.

There is no obvious theoretical explanation for the success of the novel adhesive film strips. Nevertheless, the result is convincing: there are no partial tears or even substrate damage, in contrast to the known strips having an end cut off straight. Even very sensitive substrates can be reversibly bonded in accordance with the invention, and the possible applications of these adhesive film strips, which are amazing per se, have thus been considerably broadened.

The materials for the novel adhesive film strips correspond to those in the patent specifications cited in the introduction to this specification. In general, suitable adhesive compositions and products are all those which can be removed from an adhesive join by pulling out to the side. Express reference is made to the publications cited at the outset, without repeating their entire disclosure.

Corresponding adhesive film strips can be produced by conventional processes. The starting material used can be stock rolls corresponding to DE 4 222 849 C1, but which have not been cut up during production by means of a simple shears or transverse cut, but instead, by using, for example, a saw-tooth blade, having serrated edges on both sides. The stock rolls can be processed without difficulty as described in DE 4 222 849 C1. However, the specially shaped end of the adhesive film strip can also be produced using stock bales having a straight edge cut during stamping of the individual adhesive film strips by an appropriately shaped stamping tool. Advantageous production is that which gives no scrap, for example by producing the specially shaped end of the adhesive film strip by cutting the edge of stock rolls. However, partial covering or inert printing of the strip end is also possible, for example, so that adhesive serrations remain. This method of covering and in particular printing of adhesive surfaces is also known and is in widespread use. The invention is described in greater detail in the example below, but this should not be taken to mean a restriction. All parts are by weight.

EXAMPLE

A contact adhesive composition comprising a mixture of 50 parts of SIS three-block polymer having a block polystyrene content of 29% by weight (Vector 4211, Dexco), 50 parts of a pentaester of partially hydrogenated colophony (Pentalyn H-E, Hercules) and 1 part of a phenolic anti-ageing agent is extruded in a film thickness of 600 µm onto an 80 g/m$^2$ release paper coated with silicone on both sides, and the laminate of adhesive composition and release paper is cut up to give stock rolls 120 mm in width. Cutting is carried out using a saw-tooth blade having a tooth spacing of 5 mm and a tooth width of likewise 5 mm.

In a second step, a 20 µm thick film of polyethylene terephthalate is applied to the centre (in a width of 25 mm) of one side of the above adhesive laminate, and a 125 mm wide release paper coated with a silicone on one side is subsequently applied over the entire surface of the still uncovered adhesive composition in such a way that it extends about 2.5 mm beyond the serrated end of the adhesive film on both sides. After the release paper coated with silicone on both sides has been laminated on, the same polyethylene terephthalate film and a corresponding release paper coated with silicone on one side is laminated onto the opposite side of the adhesive film in the same way as for the first adhesive side. Individual pieces of adhesive film are produced by cutting the rolled-up material in the centre and subsequently separating the pieces by means of a stamp. This gives pieces of adhesive film measuring 20 mm×50 mm with a serrated structure at their end. By using a second stamp, analogous pieces of adhesive film measuring 20 mm×50 mm with a straight end are produced.

After the samples have been bonded to a smooth PMMA sheet, a peel force of about 11 N/cm of film width at a peel rate of 300 mm/min rising to 15 N/cm at the end of the peel process, is measured for adhesive film pieces having a straight edge. Samples having a serrated adhesive strip end likewise have a peel force of 11 N/cm of film width, but this does not rise at the end of the peel process.

What is claimed is:

1. An adhesive film strip for an adhesive bond which can be separated again by pulling on the strip in the direction of the bond plane, the adhesive film strip having upper and lower surfaces and first and second ends, the first strip end terminating in a pointed, serrated, convex curved or wavy shape and the first strip from said end extending to said second end which serves as a tab for pulling, the bond area of the strip increasing from said first end toward said second end, said second end-tab being provided with a cover which is UV-opaque, said strip being adhesive on its upper and lower surfaces, the adhesive being based on a thermoplastic rubber and tackifying resins, the adhesive film having high elasticity and low plasticity, and the adhesion being lower than the cohesion, the adhesive strength substantially disappearing on stretching of the film, the ratio between peel force and tear strength being at least 1:1.5, and the adhesive composition being self-adhesive or heat-activatable.

2. An adhesive film strip according to claim 1, wherein the bond area decreases through the one strip end due to the adhesive film surface having been rendered progressively less adhesive toward the strip end by means of a cover or print reducing the adhesive area.

3. An adhesive film strip according to claim 1, wherein the capacity of the cover is effected by a dimensionally stable plastic film laminated onto both sides of the adhesive film.

4. An adhesive film strip for an adhesive bond which can be separated again by pulling on the strip in the direction of the bond plane, the adhesive film strip having upper and lower surfaces and first and second ends, the first strip end terminating in a pointed, serrated, convex curved or wavy shape and the first strip from said end extending to said second end which serves as a tab for pulling, the bond area of the strip increasing from said first end toward said second end, said second end-tab being provided with a cover which is UV-opaque, said strip being adhesive on its upper and lower surfaces, the strip comprising a highly extensible, virtually non-resilient base film and a pressure-sensitive self-adhesive composition on both sides of the base film, the base film having a sufficiently high tensile strength at break that it does not tear before the adhesive film strip has been peeled off from the substrate.

5. An adhesive film strip according to claim 4, wherein the bond area decreases through the one strip end due to the adhesive film surface having been rendered progressively less adhesive toward the strip end by means of a cover or print.

6. An adhesive film strip according to claim 4, wherein the cover is provided with a dimensionally stable plastic film laminated onto both sides of the adhesive film.

* * * * *

UNITED STATES PATENT AND TRADEMARK OFFICE
CERTIFICATE OF CORRECTION

PATENT NO. : 5,626,931
DATED : May 6, 1997
INVENTOR(S) : Luhmann, Bernd

It is certified that error appears in the above-indentified patent and that said Letters Patent is hereby corrected as shown below:

Title Page     FOREIGN PATENT DOCUMENTS: Insert
-- 3331016, 10/1984, Germany
   3714453, 12/1988, Germany
   4222849,  6/1993, Germany
   9211333,  7/1992, WIPO   --

Title Page     ABSTRACT: Line 3 delete " character " and substitute -- characterized --

Signed and Sealed this

Sixteenth Day of February, 1999

Attest:

Attesting Officer

Acting Commissioner of Patents and Trademarks